United States Patent
Su

(10) Patent No.: US 8,788,707 B1
(45) Date of Patent: Jul. 22, 2014

(54) ASSIGNING A RANDOM STATIC IP ADDRESS IN A QUARANTINE NETWORK

(75) Inventor: Jin Su, Sandy, UT (US)

(73) Assignee: Crimson Corporation, Dover, DE (US)

( * ) Notice: Subject to any disclaimer, the term of this patent is extended or adjusted under 35 U.S.C. 154(b) by 602 days.

(21) Appl. No.: 12/789,293

(22) Filed: May 27, 2010

(51) Int. Cl.
  *G06F 15/16* (2006.01)
  *H04L 29/12* (2006.01)

(52) U.S. Cl.
  CPC ............ *H04L 61/20* (2013.01); *H04L 61/2007* (2013.01); *H04L 61/2015* (2013.01); *H04L 29/12207* (2013.01); *H04L 29/12216* (2013.01); *H04L 29/12264* (2013.01)
  USPC .......................................... 709/245; 709/224

(58) Field of Classification Search
  CPC . H04L 61/20; H04L 61/2007; H04L 61/2015; H04L 29/12207; H04L 29/12216; H04L 29/12264
  USPC ............ 709/221, 220, 238, 245, 224; 726/11; 370/254, 352
  See application file for complete search history.

(56) References Cited

U.S. PATENT DOCUMENTS

| 7,159,016 | B2 * | 1/2007 | Baker | 709/220 |
| 7,633,888 | B1 * | 12/2009 | Seifer | 370/254 |
| 2009/0037998 | A1 * | 2/2009 | Adhya et al. | 726/11 |
| 2009/0129369 | A1 * | 5/2009 | Turk | 370/352 |
| 2009/0187646 | A1 * | 7/2009 | Hokkyo et al. | 709/221 |
| 2010/0174827 | A1 * | 7/2010 | Nakayama | 709/238 |
| 2010/0250716 | A1 * | 9/2010 | Jerye | 709/221 |

OTHER PUBLICATIONS

"IEEE Standard for Local and Metropolitan Area Networks Port-Based Network Access Control," IEEE Std 802.1X-2004 (Revision of IEEE Std 802.1X-2001), pp. 1-169, 2004.

* cited by examiner

*Primary Examiner* — Jungwon Chang
(74) *Attorney, Agent, or Firm* — Austin Rapp & Hardman

(57) ABSTRACT

A method for assigning a random static IP address in a quarantine network is disclosed. An initial IP address is selected from a set of reserved IP addresses. The selected IP address is assigned to a device in a quarantine network. A random static IP address is determined. The uniqueness within the quarantine network of the random static IP address is verified. The random static IP address is assigned to the device if the random static IP address is unique.

21 Claims, 7 Drawing Sheets

US 8,788,707 B1

ASSIGNING A RANDOM STATIC IP ADDRESS IN A QUARANTINE NETWORK

TECHNICAL FIELD

The present disclosure relates generally to computers and computer-related technology. More specifically, the present disclosure relates to enforcing a health policy in a local area network.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. One or more servers may provide data, services and/or may be responsible for managing other computers on a network. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. This computer hardware is often upgraded and replaced with new components. Computer software is also frequently upgraded or replaced. Furthermore, computer systems may need to be scanned in order to detect and mitigate security threats.

Outside nodes may request access to computer networks. At such time, a determination may be made about the credentials of the outside node to access resources and communicate with network nodes. In some cases a quarantine network may be maintained. Therefore, benefits may be realized from systems and methods for assigning a random static IP address in a quarantine network.

DETAILED DESCRIPTION

Figure 1:
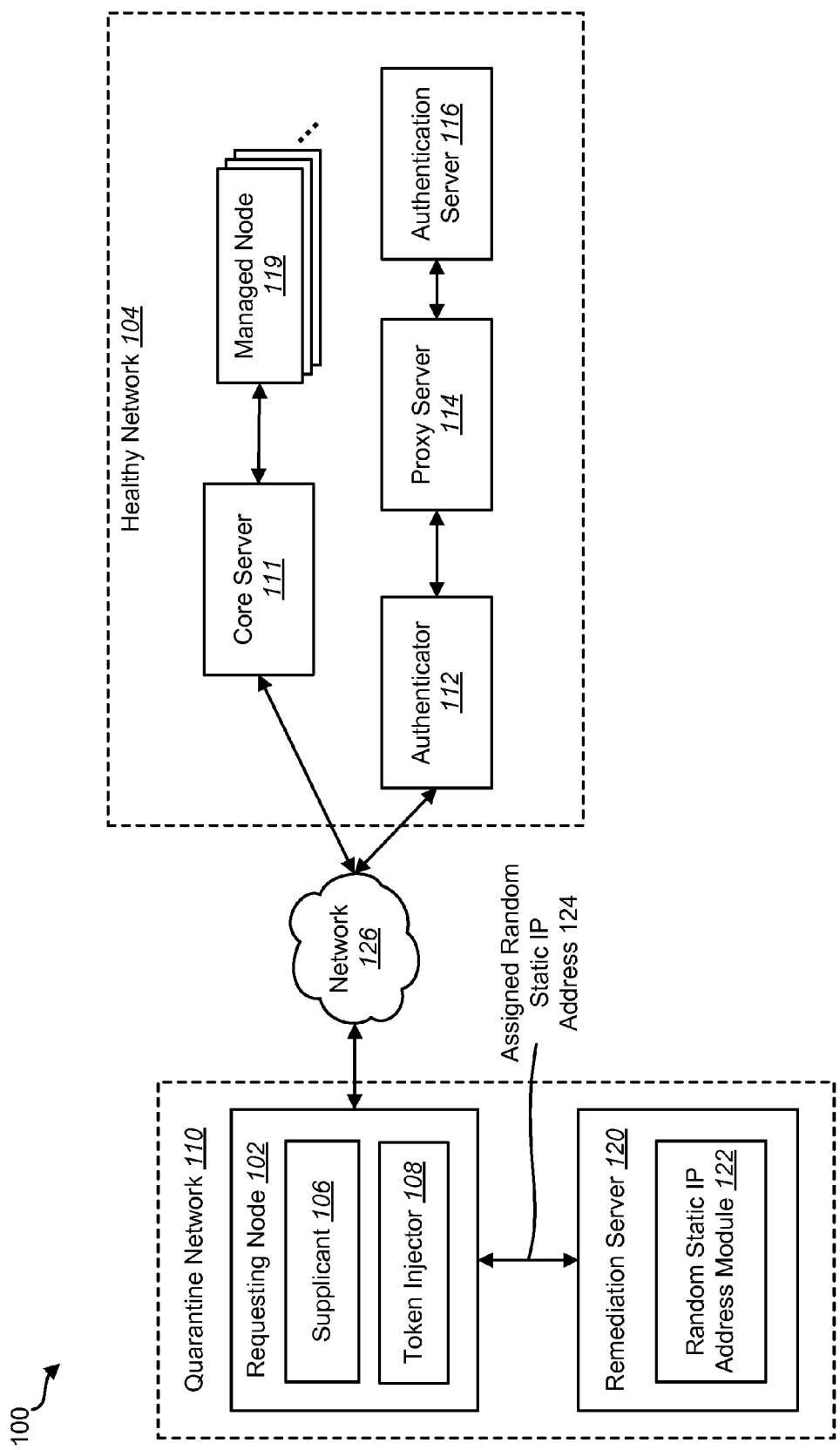
FIG. 1 is a block diagram that illustrates a system for assigning a random static IP address in a quarantine network.

A method for assigning a random static IP address in a quarantine network is disclosed. An initial IP address is selected from a set of reserved IP addresses. The selected IP address is assigned to a device in a quarantine network. A random static IP address is determined. The uniqueness within the quarantine network of the random static IP address is verified. The random static IP address is assigned to the device if the random static IP address is unique.

The random static IP address may be determined by determining a host address range based on a user-specified subnet mask and a starting IP address, and determining the random static IP address based on a normalized random host address and the starting IP address. The host address range may be determined by determining a difference of a minimum host address range and a maximum host address range. The normalized random host address may be determined by multiplying a random number, a multiplicative inverse of a maximum random number and the host address range, where the maximum random number is a largest possible value for the random number. The random static IP address may be determined by adding the normalized random host address and the starting IP address.

In one configuration, the verifying may include sending a control message protocol ping for the random static IP address. The random static IP address may not be unique if a response is received and the random static IP address may be unique if a response is not received. The control message protocol ping may be an Internet Control Message Protocol (ICMP) echo request.

A computing device that is configured for assigning a random static IP address in a quarantine network is also disclosed. The computing device includes a processor and memory in electronic communication with the processor. Executable instructions are stored in the memory. The instructions are executable to select an initial IP address from a set of reserved IP addresses. The instructions are also executable to assign the selected IP address to a device in a quarantine network. The instructions are also executable to determine a random static IP address. The instructions are also executable to verify that the random static IP address is unique in the quarantine network. The instructions are also executable to assign the random static IP address to the device if the random static IP address is unique.

A non-transitory tangible computer-readable medium for assigning a random static IP address in a quarantine network is also disclosed. The computer-readable medium includes executable instructions for selecting an initial IP address from a set of reserved IP addresses. The computer-readable medium also includes executable instructions for assigning the selected IP address to a device in a quarantine network. The computer-readable medium also includes executable instructions for determining a random static IP address. The computer-readable medium also includes executable instructions for verifying that the random static IP address is unique in the quarantine network. The computer-readable medium also includes executable instructions for assigning the random static IP address to the device if the random static IP address is unique.

Institute of Electrical and Electronics Engineers (IEEE) 802.1x is a standard that provides port-based Network Access Control (NAC). IEEE 802.1x may also provide an authentication mechanism for devices wishing to connect to a local area network (LAN). If a requesting device does not meet a health condition, it may be put into quarantine network. This device may then be remediated in the quarantine network until it complies with the health condition and is allowed into (or back into) the regular network. In an automated remediation process, the quarantined device may communicate with a remediation server in the same quarantine network. If dynamic IP is not implemented in the quarantine network, a unique static IP address that is visible to the remediation server may be generated and assigned to the machine.

The present systems and methods may generate and assign a unique static IP in a quarantine network where a Dynamic Host Configuration Protocol (DHCP) server is not available. The LANDesk Management Suite NAC (802.1x support) may use this configuration for user(s) that use a static IP address in a quarantine network.

The present systems and methods may use Internet Protocol network(s) and a quarantine network constructed by guest-VLAN with one subnet. Alternatively, Internet Control Message Protocol (ICMP) open socket may be used on a gateway if the quarantine network has multiple subnets.

FIG. 1 is a block diagram that illustrates a system 100 for assigning a random static IP address in a quarantine network 110. A requesting node 102 may request access to a healthy network 104. As used herein, the term "healthy" refers to a network 104 or device that complies with a health condition. The health condition may define updates or components that should be included in a device, e.g., the requesting node 102. In other words, health may indicate that a device includes a required patch, a required application, is sufficiently monitored by a firewall, does not include prohibited applications, etc. In one configuration, the requesting node 102 may be considered healthy if it complies with policies defined by LANDesk core server. If the requesting node 102 does not comply, as determined by a compliance scan, it may be considered unhealthy.

Since the healthy network 104 may implement 802.1x, the requesting node 102 may be subjected to authentication before it is permitted to access resources within the healthy network 104. As part of the authentication process, the requesting node 102 may include a supplicant 106. As used herein, the term "supplicant" refers to a module that communicates with one or more modules for the purpose of gaining access to a network, i.e., authentication.

The authenticator 112 may receive an authentication protocol response from the requesting node 102. The term "authenticator" 112 refers to a module (e.g., a switch or access point) that restricts the communication of the supplicant 106 with an authentication server 116, i.e., the authenticator 112 may verify the identity of the supplicant 106 before the authentication process begins with an authentication server 116. Once authentication begins, the authenticator 112 may act to forward packets between the supplicant 106 and authentication server 116. The authenticator 112 may communicate with the requesting node 102 through a network 126. Furthermore, a quarantine network 110 may also include one or more internal networks (not shown). The network 126 may be wired or wireless and may use any suitable protocol, e.g., Internet Protocol (IP). The authenticator 112 may receive the authentication protocol response and produce an encapsulation protocol response, e.g., the authenticator 112 may wrap a received Extensible Authentication Protocol (EAP) Response in a Remote Authentication Dial in User Service (RADIUS) Response.

In one configuration, the requesting node 102 may also include a token injector 108 that injects a security token into an authentication protocol response from the supplicant 106, e.g., an EAP response. The supplicant 106 may be a user or client requesting authentication for the access network (e.g., LAN 104) and the token injector 108 may be in the same physical location as the supplicant 106.

This configuration may also include a proxy server 114. The proxy server 114 may be a logic unit between the authenticator 112 and the authentication server 116 (e.g., RADIUS server) that filters and forwards authentication packets between the authenticator 112 and the authentication server 116 based on a security token injected by the token injector 108. Alternatively, the proxy server 114 may reside in the authentication server 116. The proxy server 114 may determine security tokens, or lack thereof, in authentication packets and send the packets to the authentication server 116 based on the contents of the security token. In one configuration, the security token may include data that indicates whether the supplicant 106 complies with a health policy of the healthy network 104. Alternatively, the fact that a security token is included in the authentication packet may itself indicate compliance with the health policy. The authentication server 116 may be the actual server determining whether to accept the supplicant 106 request for network access. The terms "RADIUS server" may be used interchangeably with "authentication server" herein. After successful authentication, the supplicant 106 may be granted access to the healthy network 104, e.g., other managed healthy nodes 119. The managed healthy nodes 119 may be managed by a core server 111, e.g. a LANDesk core server.

If a requesting node 102 does not comply with a health policy of the healthy network 104, it may be assigned to a quarantine network 110. A remediation server 120 in the quarantine network 110 may remediate the requesting node 102 so that it complies with the health policy. In one configuration, the remediation server 120 may provide software components, updates, or both, for the requesting node 102 so that it may comply with the health policy of the healthy network 104. A random static IP address module 122 may determine an assigned random static IP address 124 to the requesting node when a DHCP server is not available. The random static IP address module 122 may be in the remediation server 120 or a separate administrative server (not shown) for the quarantine network 110. The random static IP address module 122 may generate the assigned random static IP address 124 based on a user-specified subnet mask and starting IP address, and then check to see if the generated IP address is unique in the quarantine network 110. The remediation server 120 may be assigned an IP address that is fixed and outside of the range generated by the random static IP address module 122.

Figure 2:
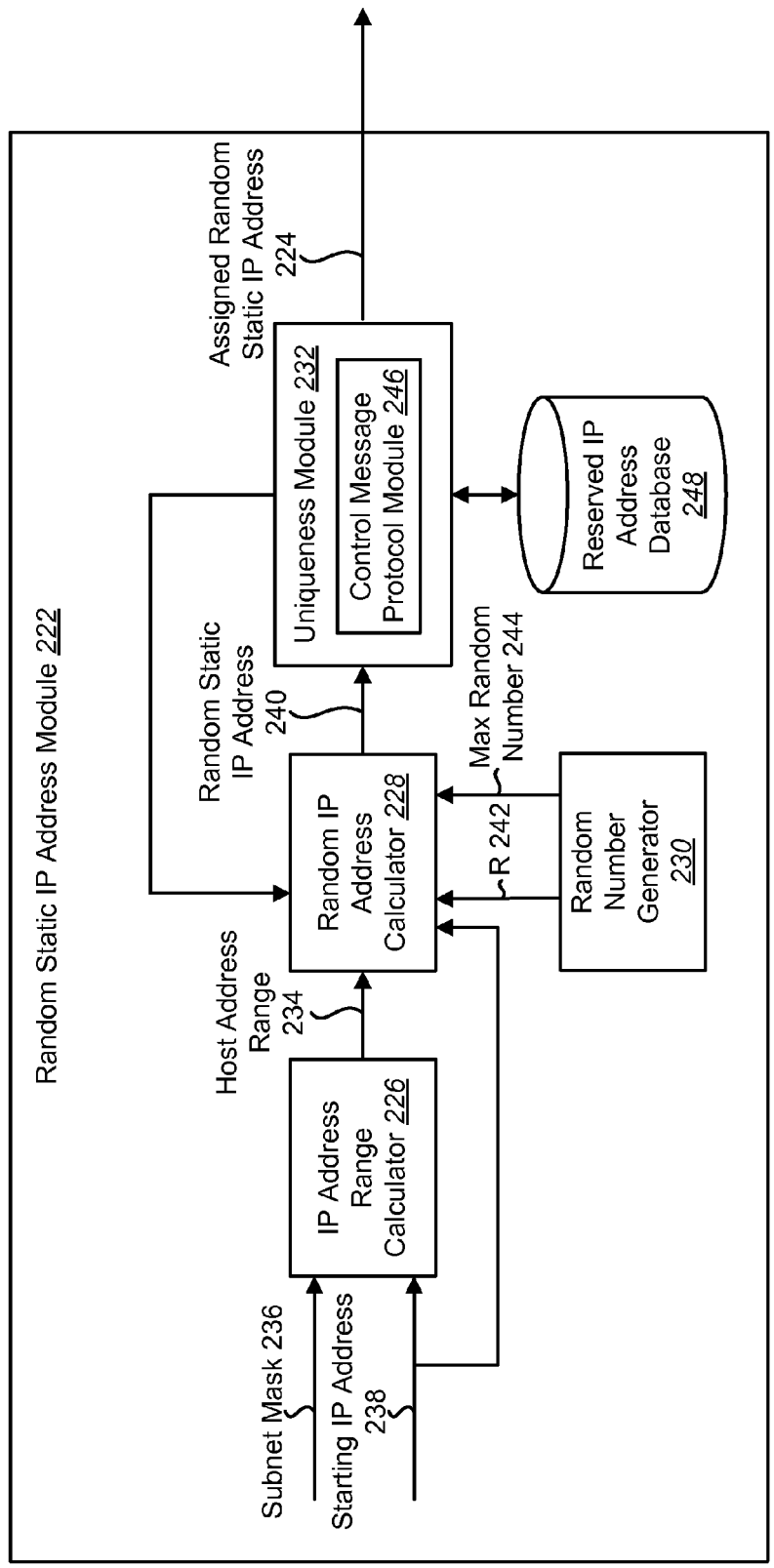
FIG. 2 is a block diagram illustrating a random static IP address module.

FIG. 2 is a block diagram illustrating a random static IP address module 222, e.g., in a remediation server 120. The module 222 may include an IP address range calculator 226, a random IP address calculator 228, a random number generator 230 and a uniqueness module 232. The IP address range calculator 226 may determine a host address range 234 based on a starting IP address 238 and a subnet mask 236.

In one configuration, the quarantine network 110 may use Internet Protocol version 4 (IPv4), the starting IP address 238 may be 169.254.1.10 and the subnet mask 236 may be 255.255.0.0. This starting IP address 238 may be a class B address with a wildcard mask of 0.0.255.255 (0x0000FFFF) that makes available host addresses from 0 to 65534 (0xFFFE). The starting IP address 238 and subnet mask 236 may be defined by a core server 111 and may be the same for all nodes in a quarantine network 110. The third and fourth values in a class B IP address identify host addresses. Host address 0xFFFF is reserved for a broadcast address. Therefore, with a starting host address of .1.10, or 266 (0x010A), the host address range 234 is 65268 according to Equation (1):

$$AddressRange = MaxHostAddr - MinHostAddr \quad (1)$$

where AddressRange is the host address range 234 from which random host addresses may be chosen, MaxHostAddr is the maximum host address (65534) and MinHostAddr is the minimum host address (266). Thus, the host address range 234 represents the difference from 266 to 65534. In one configuration, the IP address range calculator 226 may output the maximum host address and minimum host address in addition to the host address range 234. Any random static IP addresses 240 generated by the random IP address calculator 228 may include a host address portion that is greater than or equal to 266 and less than or equal to 65534.

The random IP address calculator 228 may determine a random static IP address 240 by normalizing a random number (R) 242 with a known maximum random number value 244 and the host address range 234. For example, using a random seed algorithm, the random number generator 230 may determine a random number (R) 242 with a known maximum random number value (RMax) 244, i.e., RMax 244 may represent the maximum possible value for R 242. In addition to R 242 and RMax 244, the random IP address calculator 228 may use the starting IP address 238 and the host address range 234 to determine a random static IP address 240 according to Equations (2) and (3):

$$RandomAddr = R/RMax * AddressRange \quad (2)$$

$$HostAddr = StartingAddr + RandomAddr \quad (3)$$

where RandomAddr is a normalized random host address within the host address range 234 (i.e., between the minimum host address and the maximum host address), StartingAddr is the starting IP address 238 (e.g., 169.254.1.10) and HostAddr is the random static IP address 240.

A uniqueness module 232 may determine whether the random static IP address 240 is unique in the quarantine network 110. If there is no gateway inside the quarantine network 110, a control message protocol module 246 may be used to verify uniqueness of the generated random static IP address 240. For example, Internet Control Message Protocol (ICMP) may be used. This may be a layer three resolution. To utilize IP layer ICMP protocol, a small reserved IP address database 248 may be maintained from which an initial static IP address may be assigned to a quarantined machine. This reserved static IP address pool may be allocated from below the starting IP address 238.

More specifically, an initial static IP address may be randomly selected from the reserved IP address database 248 and assigned to the quarantined machine. The random IP address calculator 228 may then determine the random static IP address 240. The control message protocol module 246 may use a control message protocol (e.g., ICMP) to ping the determined random static IP address 240, i.e., a message to determine if a device with a particular assigned IP address is accessible within the network. If a pong is received (i.e., the random static IP address 240 is not unique), the random IP address calculator 228 may determine another random static IP address 240. As used herein, the term pong refers to a response message to the control message protocol ping. If no pong is received (i.e., the random static IP address 240 is unique), the random static IP address 240 may be assigned to the quarantined machine. Therefore, the assigned random static IP address 224 is either randomly chosen from the reserved IP address database 248 or is the determined random static IP address 240 that has been verified as unique within the quarantine network.

Figure 3:
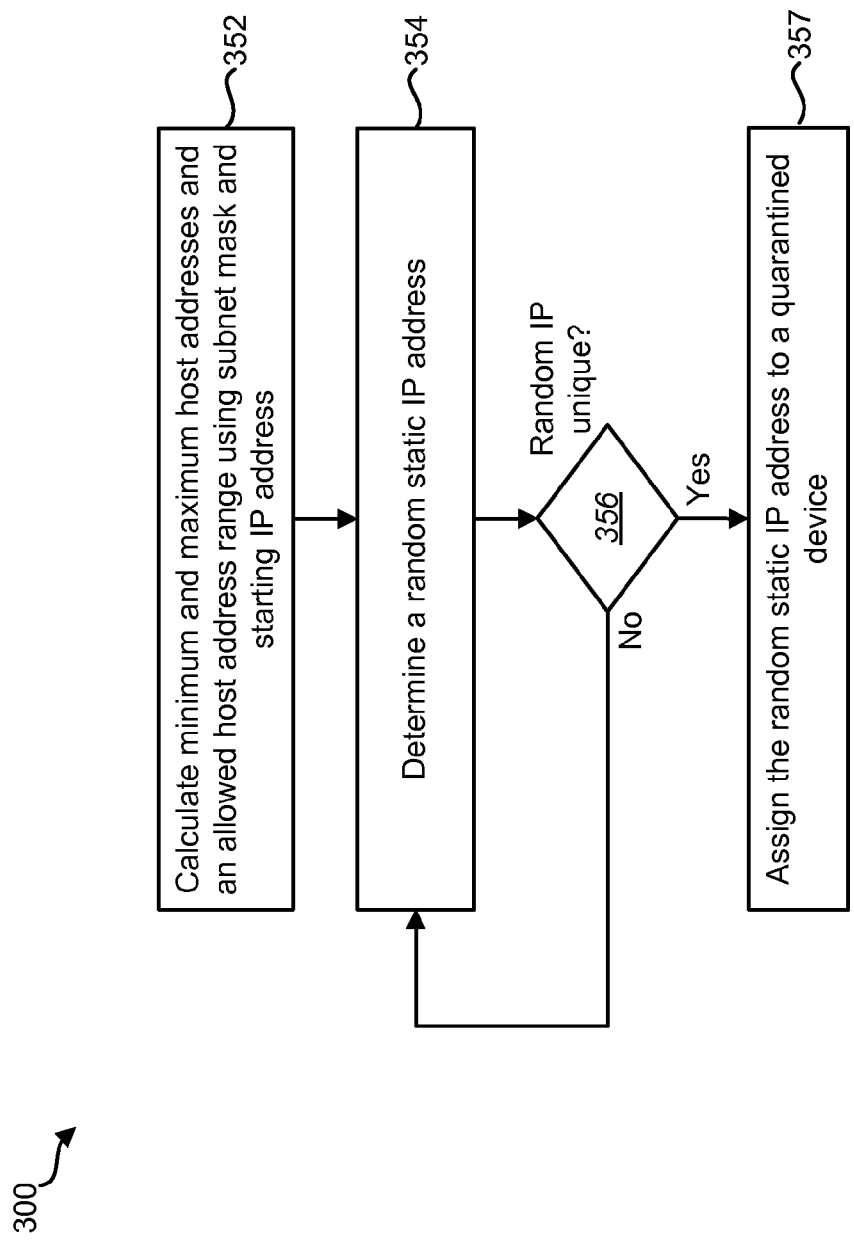
FIG. 3 is a flow diagram illustrating a method for assigning a random static IP address in a quarantine network.

FIG. 3 is a flow diagram illustrating a method 300 for assigning a random static IP address in a quarantine network. The method 300 may be performed by a random static IP address module 222. The random static IP address module 222 may initialize with a user-specified subnet mask 236 and starting IP address 238. For example, the starting IP address 238 may be 169.254.1.10 and the subnet mask 236 may be 255.255.0.0. The random static IP address module 222 may also calculate 352 a minimum host address, a maximum host address and an allowed host address range 234. The host address range 234 may be calculated according to Equation (1). This may be done in an IP address range calculator 226. The random static IP address module 222 may also determine 354 a random static IP address 240 with a host address portion greater than or equal to the minimum host address and less than or equal to the maximum host address, i.e., within the host address range 234. This may include using Equations (2) and (3), i.e., a random IP address calculator 228 may determine the random static IP address 240 using a random number generator 230. The random static IP address module 222 may determine 356 if the random static IP address is unique. In one configuration, a control message protocol module 246 in a uniqueness module 232 may ping the random static IP address 240 by sending ICMP echo request packets. If an ICMP response is received, the random static IP address 240 may not be unique and a new random static IP address 240 may be determined. However, if no ICMP response is received, the random static IP address 240 may be considered unique and the random static IP address 240 may be assigned 357 to a quarantined device. In other words, the random static IP address 240 may be the assigned random static IP address 224.

Figure 4:
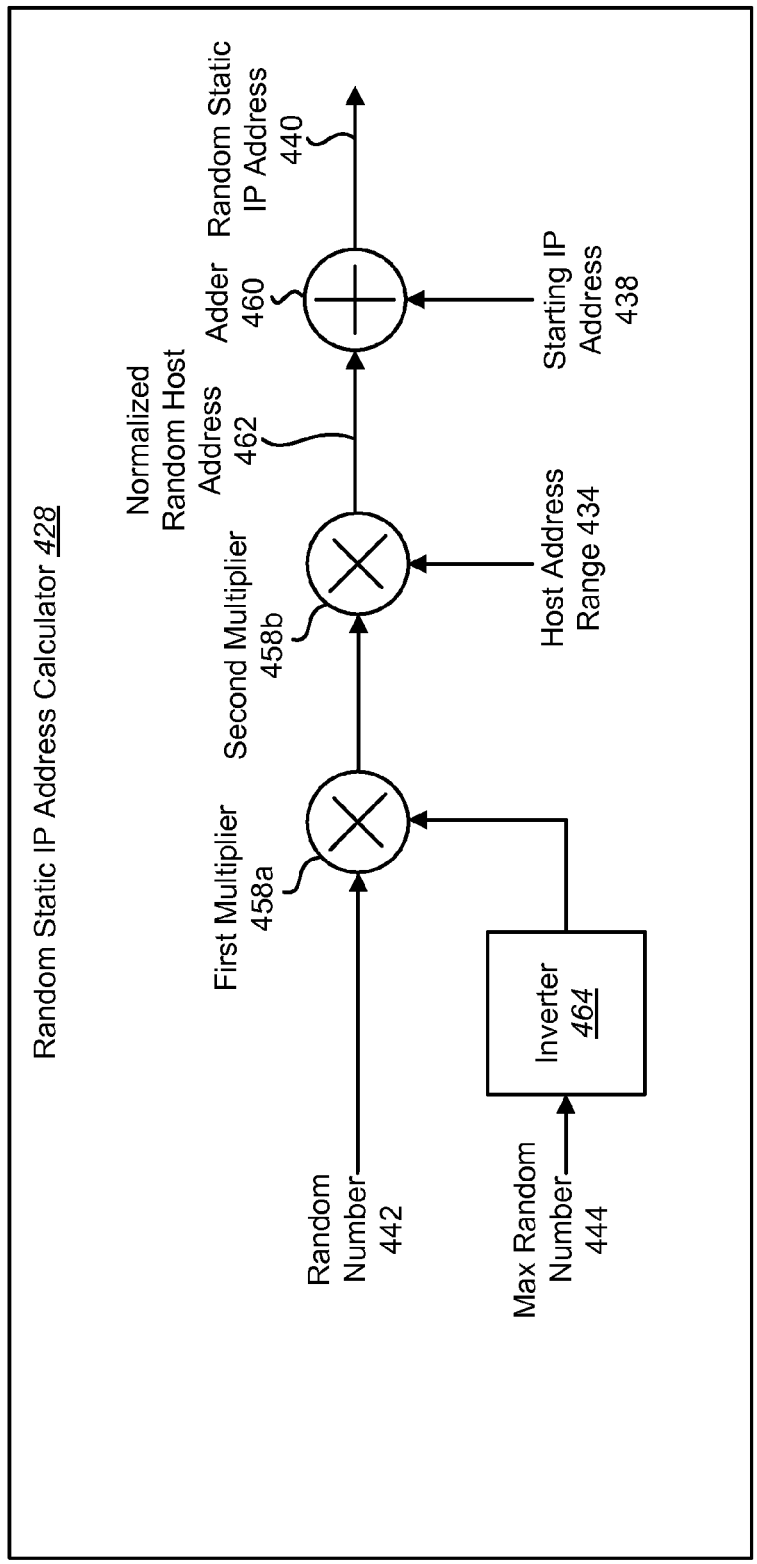
FIG. 4 is a block diagram of a random IP address calculator.

FIG. 4 is a block diagram of a random IP address calculator 428. The random IP address calculator 428 may perform the operations of Equations (2) and (3). A random number 442, a maximum random number 444, a host address range 434 and a starting IP address 438 may be received as inputs to the random IP address calculator 428 and a random static IP address 440 may be produced as the output. The maximum random number 444 may be inverted by an inverter 464 and multiplied by the random number 442, i.e., using a first multiplier 458a. This product may be multiplied by the host address range 434 to produce a normalized random host address 462, i.e., using a second multiplier 458b. The normalized random host address 462 may be added with the starting IP address 438 to produce the random static IP address 440, i.e., using an adder 460.

Figure 5:
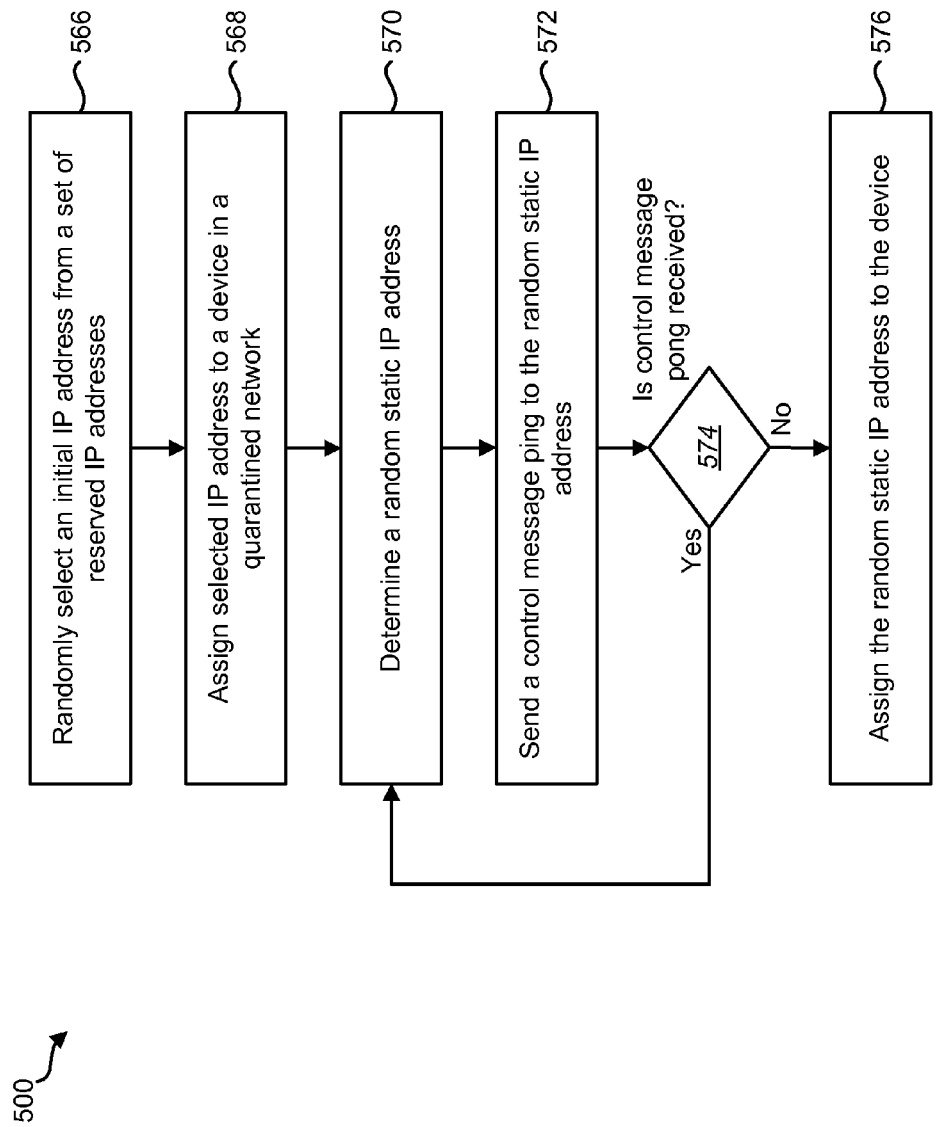
FIG. 5 is a block diagram illustrating a method for assigning a random static IP address in a quarantine network.

FIG. 5 is a block diagram illustrating a method 500 for assigning a random static IP address in a quarantine network. The method 500 may be performed by a random static IP address module 222, e.g., in a remediation server 120. The random static IP address module 222 may randomly select 566 an initial IP address from a set of reserved IP addresses, i.e., a uniqueness module 232 may randomly select from a reserved IP address database 248. The reserved IP addresses may be below a starting IP address 238. The random static IP address module 222 may also assign 568 a selected IP address to a device in a quarantined network. The random static IP address module 222 may also determine 570 a random static IP address 240, e.g., using Equations (2) and (3). The random static IP address module 222 may also send 572 a control message ping to the random static IP address 240, e.g., using ICMP. The random static IP address module 222 may also determine 574 if a control message pong is received, i.e., a response to the control message ping. If a pong is received, the random static IP address 240 may not be unique and a new random static IP address 240 may be determined 570. However, if no pong is received, the random static IP address 240 may be considered unique and the random static IP address 240 may be assigned 576 to a quarantined device.

Figure 6:
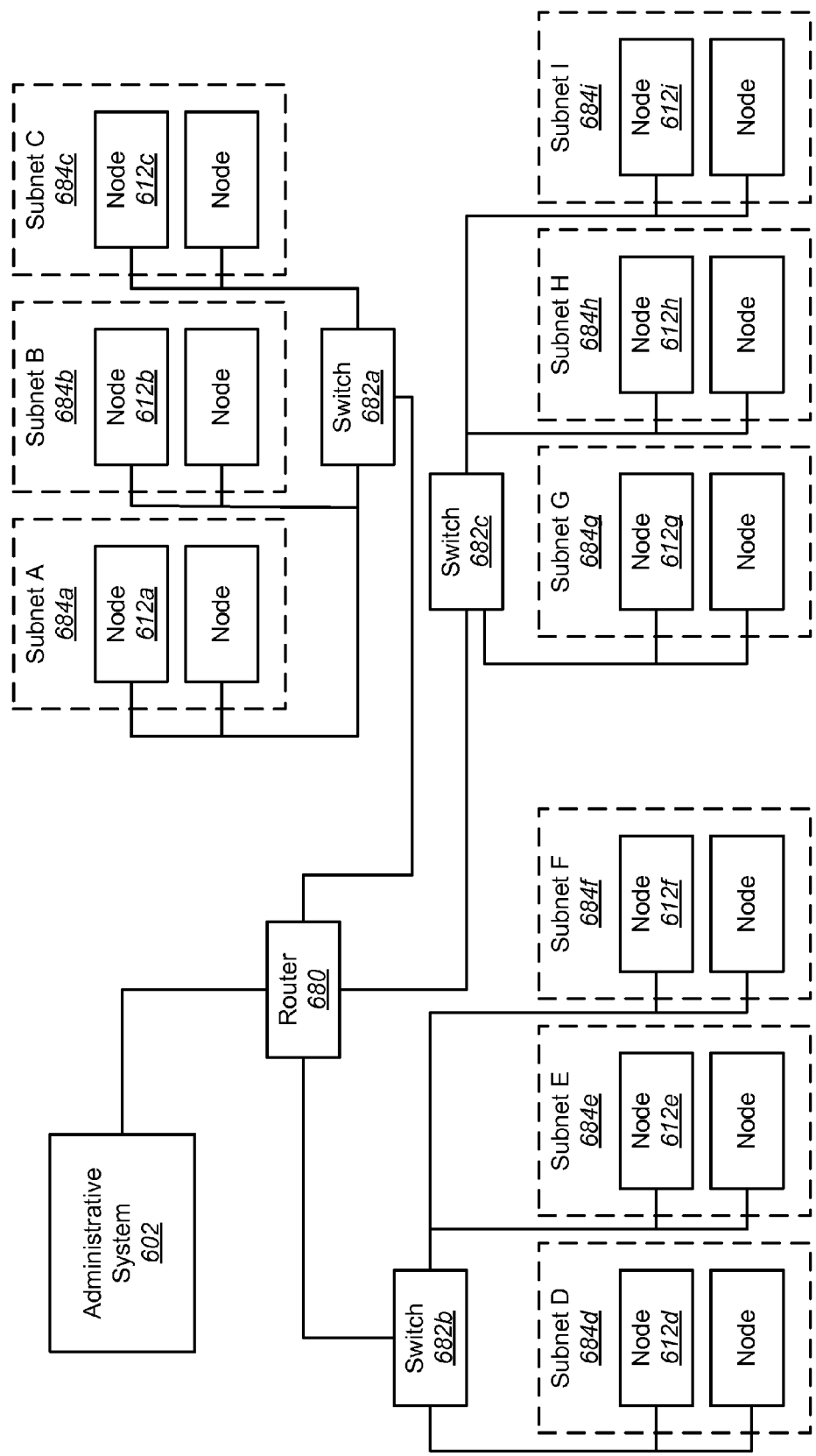
FIG. 6 is a block diagram that illustrates one configuration of a network where a system for controlling processor usage on a computing device may be implemented.

FIG. 6 is a block diagram that illustrates one configuration of a network where a system for controlling processor usage on a computing device may be implemented. An administrative system 602 is connected to a router 680. The router 680 is connected to switches 682*a*, 682*b*, 682*c*. The switch 682*a* is connected to several nodes 612*a*, 612*b*, 612*c*, etc. via their respective subnets 684*a*, 684*b*, 684*c*. The switch 682*b* is connected to several nodes 612*d*, 612*e*, 612*f*, etc. via their respective subnets 684*d*, 684*e*, 684*f*. The switch 682*c* is connected to several nodes 612*g*, 612*h*, 612*i*, etc. via their respective subnets 684*g*, 684*h*, 684*i*. Although FIG. 6 only shows one router 680, and a limited number of switches 682, subnets 684, and nodes 612, many and varied numbers of routers 680, switches 682, subnets 684, and nodes 612 may be included in networks and/or systems where a system for controlling processor usage on a computing device may be implemented.

The administrative system 602 may include an authentication server 116 and a proxy server 114. Similarly, the administrative system 602 may include a remediation server 120. The authenticator 112 may be implemented in a switch 682 or a router 680. The nodes 612 may be requesting nodes 102 and may include a supplicant 106, token injector 108, or both.

Figure 7:
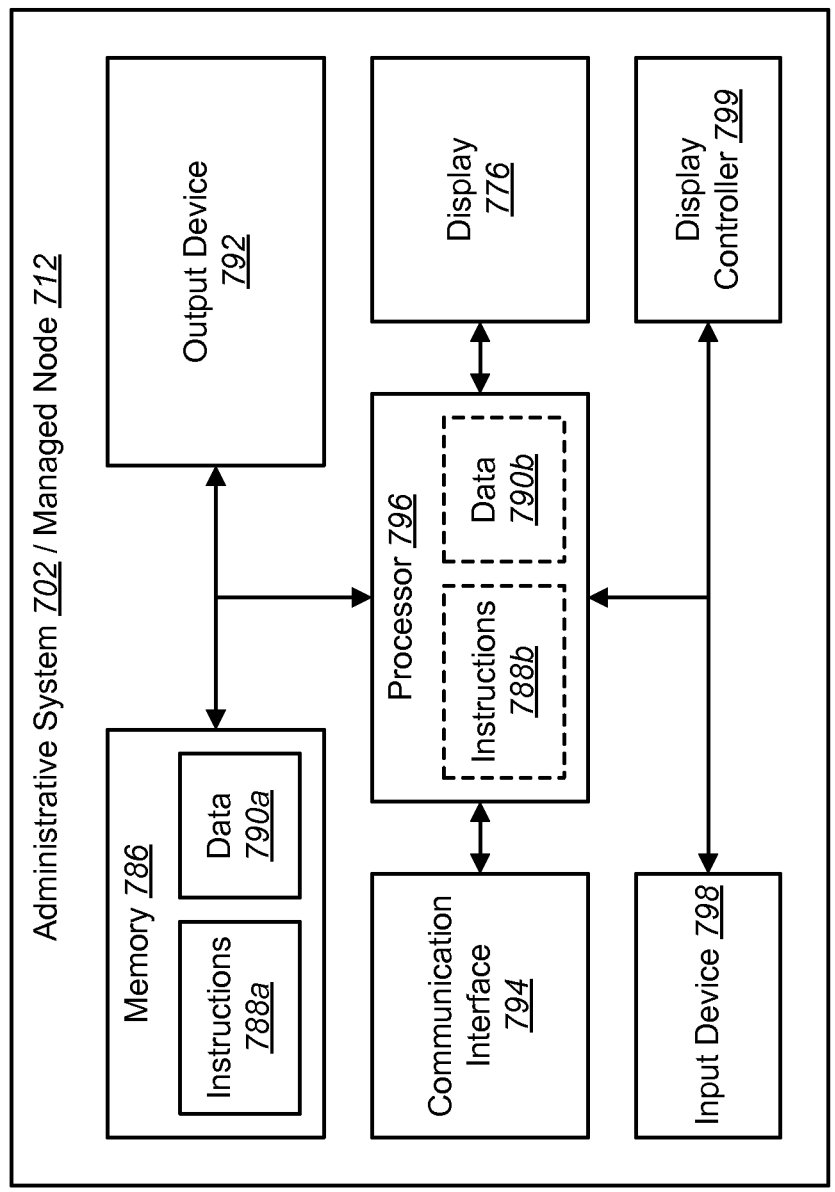
FIG. 7 illustrates various components of a computing device.

FIG. 7 illustrates various components that may be utilized in an administrative system 702 and/or a managed node 712. The illustrated components may be located within the same physical structure or in separate housings or structures.

The administrative system 702 and/or a managed node 712 may implement a remediation server 120, an authentication server 116, a proxy server 114, an authenticator 112 or a requesting node 102.

The administrative system 702 and/or managed node 712 may include a processor 796 and memory 786. The memory 786 may include instructions 788*a* and data 790*a*. The processor 796 controls the operation of the administrative system 702 and/or managed node 712 and may be, for example, a microprocessor, a microcontroller, a digital signal processor (DSP) or other device known in the art. The processor 796 typically performs logical and arithmetic operations based on program instructions 788*b* and/or data 790*b* received from the memory 786.

The administrative system 702 and/or managed node 712 typically may include one or more communication interfaces 794 for communicating with other electronic devices. The communication interfaces 794 may be based on wired communication technology, wireless communication technology, or both. Examples of different types of communication interfaces 794 include a serial port, a parallel port, a Universal Serial Bus (USB), an Ethernet adapter, an IEEE 794 bus interface, a small computer system interface (SCSI) bus interface, an infrared (IR) communication port, a Bluetooth wireless communication adapter, and so forth.

The administrative system 702 and/or managed node 712 typically may include one or more input devices 798 and one or more output devices 792. Examples of different kinds of input devices 798 include a keyboard, mouse, microphone, remote control device, button, joystick, trackball, touchpad, lightpen, etc. Examples of different kinds of output devices 792 include a speaker, printer, etc. One specific type of output device which may be typically included in a computer system is a display device 776. Display devices 776 used with configurations disclosed herein may utilize any suitable image projection technology, such as a cathode ray tube (CRT), liquid crystal display (LCD), light-emitting diode (LED), gas plasma, electroluminescence, or the like. A display controller 799 may also be provided, for converting data stored in the memory 786 into text, graphics, and/or moving images (as appropriate) shown on the display device 776.

Of course, FIG. 7 illustrates only one possible configuration of an administrative system 702 and/or managed node 712. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for assigning a random static IP address in a quarantine network, comprising:
   selecting an initial IP address from a set of reserved IP addresses;
   assigning the selected IP address to a device in a quarantine network;
   determining a random static IP address that is visible to a remediation server in the quarantine network;
   verifying that the random static IP address is unique in the quarantine network by sending, from the remediation server, a control message protocol ping for the random static IP address; and
   assigning the random static IP address to the device in the quarantine network if the random static IP address is unique.

2. The method of claim 1, wherein the determining a random static IP address comprises:
   determining a host address range based on a user-specified subnet mask and a starting IP address; and
   determining the random static IP address based on a normalized random host address and the starting IP address.

3. The method of claim 2, wherein the determining the host address range comprises determining a difference of a minimum host address range and a maximum host address range.

4. The method of claim 3, further comprising determining the normalized random host address by multiplying a random number, a multiplicative inverse of a maximum random number and the host address range, wherein the maximum random number is a largest possible value for the random number.

5. The method of claim 4, wherein the determining the random static IP address based on the normalized random host address and the starting IP address comprises adding the normalized random host address and the starting IP address.

6. The method of claim 1, wherein the random static IP address is not unique if a response is received and the random static IP address is unique if a response is not received.

7. The method of claim 1, wherein the control message protocol ping is an Internet Control Message Protocol (ICMP) echo request.

8. A computing device that is configured for assigning a random static IP address in a quarantine network, comprising:
   a processor;
   memory in electronic communication with the processor;
   instructions stored in the memory, the instructions being executable to:
     select an initial IP address from a set of reserved IP addresses;
     assign the selected IP address to a device in a quarantine network;
     determine a random static IP address that is visible to a remediation server in the quarantine network;
     verify that the random static IP address is unique in the quarantine network by sending, from the remediation server, a control message protocol ping for the random static IP address; and
     assign the random static IP address to the device in the quarantine network if the random static IP address is unique.

9. The computing device of claim 8, wherein the instructions executable to determine a random static IP address comprise instructions executable to:
   determine a host address range based on a user-specified subnet mask and a starting IP address; and
   determine the random static IP address based on a normalized random host address and the starting IP address.

10. The computing device of claim 9, wherein the instructions executable to determine the host address range comprise instructions executable to determine a difference of a minimum host address range and a maximum host address range.

11. The computing device of claim 10, further comprising instructions executable to determine the normalized random host address by multiplying a random number, a multiplicative inverse of a maximum random number and the host address range, wherein the maximum random number is a largest possible value for the random number.

12. The computing device of claim 11, wherein the instructions executable to determine the random static IP address based on the normalized random host address and the starting IP address comprise instructions executable to add the normalized random host address and the starting IP address.

13. The computing device of claim 8, wherein the random static IP address is not unique if a response is received and the random static IP address is unique if a response is not received.

14. The computing device of claim 8, wherein the control message protocol ping is an Internet Control Message Protocol (ICMP) echo request.

15. A non-transitory tangible computer-readable medium for assigning a random static IP address in a quarantine network comprising executable instructions for:
   selecting an initial IP address from a set of reserved IP addresses;
   assigning the selected IP address to a device in a quarantine network;
   determining a random static IP address that is visible to a remediation server in the quarantine network;
   verifying that the random static IP address is unique in the quarantine network by sending, from the remediation server, a control message protocol ping for the random static IP address; and assigning the random static IP address to the device in the quarantine network if the random static IP address is unique.

16. The computer-readable medium of claim 15, wherein the determining a random static IP address comprises executable instructions for:
   determining a host address range based on a user-specified subnet mask and a starting IP address; and
   determining the random static IP address based on a normalized random host address and the starting IP address.

17. The computer-readable medium of claim 16, wherein the executable instructions for determining the host address range comprise executable instructions for determining a difference of a minimum host address range and a maximum host address range.

18. The computer-readable medium of claim 17, further comprising executable instructions for determining the normalized random host address by multiplying a random number, a multiplicative inverse of a maximum random number and the host address range, wherein the maximum random number is a largest possible value for the random number.

19. The computer-readable medium of claim 18, wherein the executable instructions for determining the random static IP address based on the normalized random host address and the starting IP address comprise executable instructions for adding the normalized random host address and the starting IP address.

20. The computer-readable medium of claim 15, wherein the random static IP address is not unique if a response is received and the random static IP address is unique if a response is not received.

21. The computer-readable medium of claim 15, wherein the control message protocol ping is an Internet Control Message Protocol (ICMP) echo request.

* * * * *